US012640767B2

(12) United States Patent
Pehlke

(10) Patent No.: US 12,640,767 B2
(45) Date of Patent: May 26, 2026

(54) SYSTEMS, DEVICES, AND METHODS RELATED TO RF FRONT-END ARCHITECTURES WITH INTEGRATED ANTENNA SWITCH CIRCUITRY

(71) Applicant: SKYWORKS SOLUTIONS, INC, Irvine, CA (US)

(72) Inventor: David Richard Pehlke, Westlake Village, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 308 days.

(21) Appl. No.: 18/223,270

(22) Filed: Jul. 18, 2023

(65) Prior Publication Data

US 2024/0030959 A1    Jan. 25, 2024

Related U.S. Application Data

(60) Provisional application No. 63/390,624, filed on Jul. 19, 2022.

(51) Int. Cl.
*H04B 1/401* (2015.01)
*H04B 1/00* (2006.01)
*H04B 7/06* (2006.01)

(52) U.S. Cl.
CPC ........... *H04B 1/401* (2013.01); *H04B 1/0057* (2013.01); *H04B 7/0602* (2013.01)

(58) Field of Classification Search
CPC ..... H04B 1/0057; H04B 1/006; H04B 7/0602
See application file for complete search history.

(56) References Cited

U.S. PATENT DOCUMENTS

| | | | | |
|---|---|---|---|---|
| 9,660,687 B2 * | 5/2017 | Ellä | ........................... | H04B 1/40 |
| 10,581,466 B2 * | 3/2020 | Pehlke | ................. | H04B 1/0057 |
| 10,594,362 B2 * | 3/2020 | Murakami | ............... | H01Q 1/38 |
| 11,349,504 B2 * | 5/2022 | Pehlke | ................. | H04B 7/0825 |
| 2008/0080628 A1 * | 4/2008 | To | .......................... | H04L 27/261 |
| | | | | 375/260 |
| 2014/0087680 A1 * | 3/2014 | Luukkala | ................ | H04W 4/90 |
| | | | | 455/404.1 |
| 2014/0293841 A1 * | 10/2014 | Rousu | ....................... | H04L 5/08 |
| | | | | 370/278 |
| 2014/0302810 A1 * | 10/2014 | Inha | ......................... | H04W 4/70 |
| | | | | 455/556.1 |
| 2014/0307599 A1 * | 10/2014 | Rousu | ................... | H04L 5/0028 |
| | | | | 370/297 |
| 2015/0029836 A1 * | 1/2015 | Hans | ...................... | H04W 40/02 |
| | | | | 370/328 |
| 2016/0087655 A1 * | 3/2016 | Kim | ...................... | H04W 4/029 |
| | | | | 455/404.1 |
| 2016/0126982 A1 * | 5/2016 | Hayafuji | .................. | H04B 1/18 |
| | | | | 370/328 |
| 2017/0207846 A1 * | 7/2017 | Khlat | ................... | H04B 7/0868 |

(Continued)

*Primary Examiner* — Charles R Craver
(74) *Attorney, Agent, or Firm* — Chang & Hale LLP

(57) ABSTRACT

A system may include an antenna. A system may include a module including a power amplifier and an antenna switch. A system may include an antennaplexer communicatively coupled to the antenna and the antenna switch, the antennaplexer positioned between the antenna switch and the antenna in a signal path. A system may include a controller communicatively coupled to the module, the controller configured to control the antenna switch with an override signal.

16 Claims, 8 Drawing Sheets

(56) References Cited

U.S. PATENT DOCUMENTS

| | | | |
|---|---|---|---|
| 2019/0149178 A1* | 5/2019 | King | H04L 5/001 |
| | | | 455/78 |
| 2019/0190548 A1* | 6/2019 | Chang | H04L 5/14 |
| 2019/0273519 A1* | 9/2019 | Shinozaki | H04B 1/48 |
| 2023/0403181 A1* | 12/2023 | Dornbusch | H04L 12/66 |
| 2024/0244413 A1* | 7/2024 | Wellens | H04L 67/12 |

* cited by examiner

500

DETERMINE A VEHICLE COLLISION
EVENT HAS OCCURRED ~502

SELECT A MODULE INCLUDING A
POWER AMPLIFIER AND AN
ANTENNA SWITCH CIRCUITRY ~504

PROVIDE AN OVERRIDE SIGNAL TO
THE MODULE ~506

600

RECEIVE AN OVERRIDE SIGNAL     ~602

SELECT AN ANTENNA BASED ON
THE OVERRIDE SIGNAL     ~604

TRANSMIT AN ECALL SIGNAL VIA
THE ANTENNA     ~606

800

RADIO-FREQUENCY DEVICE

LNA(S) ~812

808

820     802     804

USER INTERFACE

BASEBAND SUB-SYSTEM

TRANSCEIVER

FE MODULE(S)

POWER AMPLIFIER ~822

ANTENNA SWITCH ~824

DUPLEXER(S) ~826

SWITCH ASSEMBLY ~828

ANTENNAPLEXER(S)

810a

810b

MEMORY

CONTROLLER(S)

822

FILTER(S)

818     806     830

POWER MANAGEMENT     BATTERY 814     816

SYSTEMS, DEVICES, AND METHODS RELATED TO RF FRONT-END ARCHITECTURES WITH INTEGRATED ANTENNA SWITCH CIRCUITRY

CROSS-REFERENCE TO RELATED APPLICATION(S)

This application claims priority to U.S. Provisional Application No. 63/390,624 filed Jul. 19, 2022, entitled RF FRONT-END ARCHITECTURES WITH INTEGRATED ANTENNA SWITCH CIRCUITRY, the disclosure of which is hereby expressly incorporated by reference herein in its entirety.

BACKGROUND

Field

The present disclosure relates to improving communication availability and reliability for emergency transmissions.

Description of the Related Art

Wireless communication devices include many antennas, filters, and amplifiers arranged in a variety of configurations to provide support for different frequency bands. Generally, conventional cellular radio-frequency front-end (RFFE) architectures employed for the wireless communication devices support a number of applications related to the antenna interface. One such important application is switching of antenna (e.g., antenna switching) used in communication. As a limited number of antennas are physically available to a wireless communication device and a greater number of frequency bands are collectively employed to enable MIMO, beamforming, and other meaningful configurations, intelligent and timely switching of antennas is becoming all the more important. Additionally, in certain scenarios such as emergency situations, switching communication paths to prioritize functioning antennas over defunct antennas can be of great importance. For instance, correct antenna switching can ensure successful emergency transmission to bring rapid assistance to motorists involved in a vehicle collision event in accordance with eCALL (alternatively, eCall) initiative.

SUMMARY

In accordance with a number of implementations, the present disclosure relates to a system including: an antenna; a module including a power amplifier and an antenna switch; an antennaplexer communicatively coupled to the antenna and the antenna switch, the antennaplexer positioned between the antenna switch and the antenna in a signal path; and a controller communicatively coupled to the module, the controller configured to control the antenna switch with an override signal.

In some aspects, the techniques described herein relate to a system wherein the controller is configured to send the override signal to the module in response to an occurrence of a vehicle collision.

In some aspects, the techniques described herein relate to a system wherein the occurrence of the vehicle collision is determined by the controller.

In some aspects, the techniques described herein relate to a system wherein a radio-frequency front-end controller makes a determination of the occurrence of the vehicle collision and the radio-frequency front-end controller sends the determination to the controller.

In some aspects, the techniques described herein relate to a system wherein the determination is made based on at least one of an inertial measurement unit, an accelerometer, or a collision sensor.

In some aspects, the techniques described herein relate to a system wherein the override signal includes a code indicative of an antenna to select.

In some aspects, the techniques described herein relate to a system wherein the override signal causes the antenna switch to select the antenna based on at least one of a state, a condition, or a performance of the antenna.

In some aspects, the techniques described herein relate to a system wherein the state, the condition, or the performance of the antenna is received from a radio-frequency front-end controller.

In some aspects, the techniques described herein relate to a system further including a second antenna and a second antennaplexer communicatively coupled to the second antenna and the antenna switch, the second antennaplexer positioned between the antenna switch and the second antenna in a second signal path.

In some aspects, the techniques described herein relate to a system wherein the override signal causes the antenna switch to select the second antenna and route a transmission signal to the second antennaplexer.

In some aspects, the techniques described herein relate to a system further including a second module including a second power amplifier and a second antenna switch, the second antenna switch communicatively coupled with the antenna switch.

In some aspects, the techniques described herein relate to a system wherein the override signal causes the antenna switch to route a transmission signal to a second antenna via the second antenna switch.

In some aspects, the techniques described herein relate to a system wherein the module includes a power amplifier with integrated duplexer associated with a frequency band and the second module includes a diversity receiver associated with the frequency band.

In some aspects, the techniques described herein relate to a system wherein the module includes a power amplifier with integrated duplexer associated with a frequency band and the second module includes a multiple-in-multiple-out (MIMO) diversity receiver associated with the frequency band.

In some aspects, the techniques described herein relate to a packaged module including: a packaging substrate; and a circuit implemented on the packaging substrate, the circuit including a power amplifier, an antenna switch configured to select an antenna from a plurality of antennas, a multiplexer communicatively coupled to the antenna switch and the antenna, the multiplexer positioned between the antenna switch and the antenna in a signal trace, and at least one input trace, the input trace configured to receive an override signal from a controller.

In some aspects, the techniques described herein relate to a packaged module wherein the antenna switch is configured to select the antenna in response to receipt of the override signal.

In some aspects, the techniques described herein relate to a packaged module wherein the override signal is based on a vehicle collision event and the antenna transmits a signal associated with the vehicle collision event.

In some aspects, the techniques described herein relate to a packaged module wherein the antenna switch is configured to forward the signal to a second antenna switch included on a second circuit implemented on a second packaging substrate.

In some aspects, the techniques described herein relate to a controller including: a first pinout configured to provide a first override signal to a first module including a first amplifier and a first antenna switch; a second pinout configured to provide a second override signal to a second module including a second amplifier and a second antenna switch; and a memory configured to store instructions that cause the controller to determine an occurrence of a vehicle collision event and provide at least one of the first override signal or the second override signal.

In some aspects, the techniques described herein relate to a controller wherein the controller is configured to receive at least one of a state, a condition, or a performance information associated with an antenna and generate the first override signal that instructs the first antenna switch to select the antenna based on the at least one of the state, the condition, or the performance.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

Figure 1:
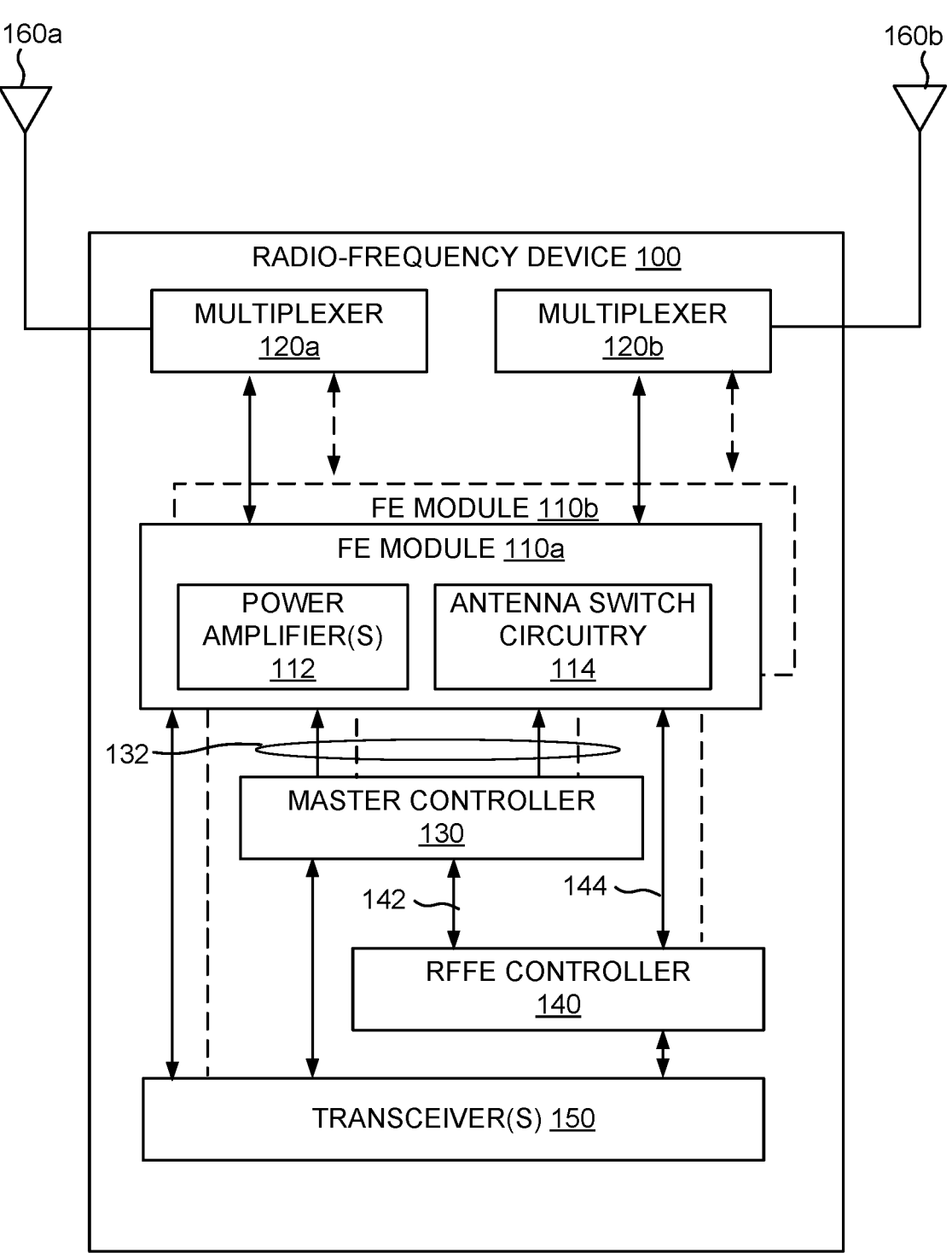
FIG. 1 illustrates an example radio-frequency device having various features relevant to certain aspects of the present disclosure in accordance with one or more embodiments.

Wireless communication devices include many antennas, filters, and amplifiers arranged in a variety of configurations to provide support for different frequency bands. Generally, conventional cellular radio-frequency front-end (RFFE) architectures employed for the wireless communication devices support a number of applications related to the antenna interface. One such important application is switching of antenna (e.g., antenna switching) used in communication. As a limited number of antennas are physically available to a wireless communication device and a greater number of frequency bands are collectively employed to enable MIMO, beamforming, and other meaningful configurations, intelligent and timely switching of antennas is becoming all the more important. Additionally, in certain scenarios such as emergency situations, switching communication paths to prioritize functioning antennas over defunct antennas can be of great importance. For instance, correct antenna switching can ensure successful emergency transmission to bring rapid assistance to motorists involved in a vehicle collision event in accordance with eCALL (alternatively, eCall) initiative.

Conventional antenna switching solutions employ configurations that position, for transmission signal paths, power amplifier modules before multiplexers (e.g., antennaplexers), antenna switch, and an antenna, in that order. In other words, conventional antenna switching solutions position antenna switches post multiplexers. Further details on such conventional antenna switching configurations are later provided in relation to FIG. 2 and FIG. 3.

An improved approach disclosed herein proposes configurations that integrates antenna switching into power amplifier modules. For instance, the improved approach integrates an antenna switching circuitry (interchangeably, an antenna switch module (ASM)) within a power-amplifier integrated duplexers (PAiD). Accordingly, this disclosure is directed to, in part, systems and techniques that combine power amplifiers and antenna switches in innovative configurations. The systems and techniques disclosed herein can select different antennas and change the antenna connectivity based on the states/conditions/performances of the antennas. Compared to the conventional antenna switching solutions, the improved approach can provide numerous advantages including (1) lower insertion loss versus the cascading of an additional series switch, (2) improved intermodulation, harmonic generation, and Rx Self-DeSense when the switch function is protected by the out-of-band (OOB) attenuation filtering of multiplexers, and (3) smaller and lower cost implementation.

In some embodiments, systems and techniques are discussed herein in the context of frequency bands that are associated with low-range (LB), mid-to-high-range (MHB), ultra-high-band (UHB) frequencies. However, it should be understood that the systems and techniques can be applied to a wide variety of frequencies and/or frequency ranges.

FIG. 1 illustrates an example radio-frequency device 100 having various features relevant to certain aspects of the present disclosure in accordance with one or more embodiments. The radio-frequency device 100 can include a set of front-end (FE) modules 110a-b, a master controller 130, an RFFE controller 140, a transceiver(s) 150, and a set of antennas 160a-b. As illustrated, the radio-frequency device 100 can have multiple FE modules 110a-b. In the example radio-frequency device 100, there are two FE modules 110a-b but it is possible there are fewer or more FE modules. Dashed lines indicate optional components and signal paths. For instance, the FE module 110b and associated signal paths can be optional, thereby indicating possibility of two or more FE modules communicatively coupled to the multiplexers (e.g., antennaplexers) 120a-b.

The transceiver 150 can be configured to convert between analog signals and digital signals. The transceiver 150 can include a digital-to-analog converter, an analog-to-digital converter, a local oscillator for modulating or demodulating a baseband signal to or from a carrier frequency, a baseband processor that converts between digital samples and data bits (e.g., voice or other types of data), and/or other components. The FE modules 110a-b can perform processing on a received signal from the antennas 160a-b and the multiplexers 120a-b or transmit signal from the transceiver 150. In some embodiments, the FE modules 110a-b can be referred to as a front-end modules (FEM) and the multiplexers 120a-b can be referred to as antennaplexers. The multiplexers 120a-b can be physically close to the antennas 160a-b (e.g., to reduce attenuation to cable loss). The RFFE controller 140 can communicate with the transceiver 150 and/or at least one FE module 110 to facilitate various functionality discussed herein. Although the RFFE controller 140 is illustrated as a separate component, in some embodiments the RFFE controller 140 can be a part of the at least one FE module 110.

An FE module 110 can include one or more power amplifier(s) 112 and an antenna switch circuitry (e.g., an ASM) 114. In some embodiments, the FE module 110 can include the RFFE controller 140, while in other embodiments the RFFE controller 140 can be implemented as a separate component outside the FE module 110, such as within another FE module or within another component. The power amplifier 112, the antenna switch circuitry 114, the master controller 130, the RFFE controller 140, the transceiver 150, and/or other components discussed herein can be communicatively coupled to each other in a variety of manners, such as through a conductive path(s) that can include a cable, a trace, a wire, or any other conductive path/material. Although not illustrated in FIG. 1, the FE modules 110a-b can also include other components, such as attenuators, matching circuits, duplexers, and so on.

A multiplexer 120 (also referred to as "the N-plexer") can be configured to implement multiplexing. The multiplexer 120 can include a diplexer, triplexer, quadplexer, or any N-plexer. In some example transmit operations, the multiplexers 120 can be configured to combine/merge a plurality of signals onto a common path or port (which can be connected to the one or more antennas 160a-b). Further, in some examples of receive operations, the multiplexer 120 can be configured to split/sort a signal from a common path or port (which can be connected to the antennas 160a-b) into a plurality of signals. In some embodiments, each path or channel can be associated with a frequency band. The multiplexer 120 can include one or more filters, one or more switches, and/or other components. In one example implementation, the multiplexer 120 can include a low pass filter that passes frequencies associated with low-range frequency bands, a bandpass filter that passes frequencies associated with mid-range frequency bands, a high pass filter that passes frequencies associated with high-range frequency bands, or other filters associated with other frequency bands. See, for example, an antennaplexer 430 of FIG. 4. In another example implementation, the multiplexer 120 can be implemented as a diplexer that provides the functionality of a high pass filter and a low pass filter. See, for example, an antennaplexer 432 of FIG. 4.

The filters can include multiple filters that are configured to support different frequency ranges (e.g., filter signals associated with different frequency bands). For example, the filters can include one or more Tx filters that are configured to support one or more transmit frequency bands and/or one or more Rx filters that are configured to support one or more receive frequency bands. In some example transmit operations, the filters can receive a signal from the power amplifier 112 or other component and filter the signal. Further, in some examples of performing receive operations, the filters can receive a signal, filter the signal, and output the filtered signal to the antenna switch circuitry 114 of the FE module(s) 110a-b. In some embodiments, the filters include one or more filters configured to support one more low-range bands (LB), one or more mid-to-low-range bands (MLB), one or more mid-to-high-range bands (MHB), one or more high-range bands (HB), one or ultra-high-range bands (UHB), and so on.

The antenna switch circuitry 114 can include one or more switches or other circuitry configured to selectively route one or more signals between components of the FE module 110. A switch can include a transistor(s), a mechanical switch(s), or any other switch, and/or can include any number of throws/poles. In some embodiments, the antenna switch circuitry 114 can include a switch (e.g., a band select switch) that is configured to receive a signal from the multiplexers 120a-b and selectively route the signal. In some embodiments, the antenna switch circuitry 114 includes a multi-arm-controlled switch that is configured to enable/disable multiple paths simultaneously. Additionally, in some embodiments, the antenna switch circuitry 114 can include one or more switches that are configured to receive one or more control signals from the multiplexers 120a-b and selectively route a signal to one or more of RFFE controller 140.

The RFFE controller 140 can be configured to generate and/or send control signals to components of the radio-frequency device 100. For example, the RFFE controller 140 can send a control signal to the multiplexers 120a-b to control sorting or combining of signals, send a control signal to the antenna switch circuitry 114 to route a signal (e.g., turn on or off a switch), send a control signal to the multiplexers 120a-b to enable/disable a multiplexer, and so on. In some embodiments, the radio-frequency device 100 is configured to implement a plurality of gain modes for different amounts of amplification, and the RFFE controller 140 is configured to send a control signal to the FE module(s) 110a-b to control a gain mode of the power amplifier(s) 112. Each gain mode can be associated with a different amount of amplification. For example, the RFFE controller 140 can provide a control signal indicative of a desired or targeted gain. In some embodiments, the RFFE controller 140 can include control circuitry configured to implement one or more of the operations discussed herein.

In some embodiments, the RFFE controller 140 is configured to detect state/condition/performance of the antennas 160a-b and send an update signal 142 to the master controller 130 to inform the FE modules 110a-b and/or the master controller 130 of the status/condition/performance of the antennas 160a-b. For instance, the RFFE controller 140 can determine that the antenna 160a shows degraded performance and inform the master controller 130 of the degraded performance. In turn, the master controller 130 can intelligently instruct the FE modules 110a-b to select an unaffected or less affected signal path(s) with a respective antenna switch circuitry 114 by providing an override signal(s) 132. Similarly, the RFFE controller 140 may directly inform an FE module 110 with a signal 144 such that the FE module 110 can instruct the antenna switch circuitry 114 to prioritize the antenna 160b over the antenna 160a, vice versa. In some embodiments, the master controller 130 may request information regarding the state/condition/performance of the antennas 160a-b from the RFFE controller 140 via a request signal 142.

The antennas 160a-b can include one or more primary antennas and/or one or more diversity antennas. A primary antenna and a diversity antenna can be physically spaced apart such that a signal at the primary antenna and the diversity antenna are received with different characteristics. For example, a primary antenna and a diversity antenna can receive the signal with different attenuation, noise, frequency response, and/or phase shift. The transceiver 150 can use both of the signals with different characteristics to determine data bits corresponding to the signal. In some implementations, the transceiver 150 utilizes a primary antenna or a diversity antenna based on the characteristics, such as selecting an antenna with the highest signal-to-noise ratio (SNR). In some embodiments, the transceiver 150 combines signals from a primary antenna and a diversity antenna to increase the SNR of the combined signal. In some embodiments, the transceiver 150 processes signals to perform multiple-input/multiple-output (MIMO) communication.

The master controller 130 can be configured to generate and/or send the override signal 132 to the FE modules 110*a-b*. The override signal 132 can instruct the FE modules 110*a-b* to switch wireless communication to use an antenna different from a currently used antenna. For example, in the operation of the radio-frequency device 100, the master controller 130 can send the override signal 132 to the FE module 110*a* in which the antenna switch circuitry 114 has selected the first antenna 160*a* via the first multiplexer 120*a*. Upon reception of the override signal 132 from the master controller 130, the FE module 110*a* can instruct the antenna switch circuitry 114 to select and use the second antenna 160*b* via the second multiplexer 120*b* for future wireless communication.

The master controller 130 can send the override signal 132 over a general-purpose output (GPO) pin(s) or other control signal paths connected to the FE modules 110*a-b*. In some embodiments, the override signal 132 can be as simple as a single override bit/wire that an FE module 110 can interpret to allow antenna switch circuitry 114 to select a default antenna. In some other embodiments, a more comprehensive override signal 132 can additionally indicate which antenna the antenna switch circuitry 114 should select by providing specific antenna selection information.

The override signal 132 can be provided out of sync from (e.g., uncoordinated with) the timing of radio communication. As an example, the need for the override signal 132 can rise as a result of a vehicle collision event in which an emergency signal is to be transmitted from the vehicle to outside entities in accordance with eCALL protocol. For instance, signals including collision time and location, severity, persons involved can be transmitted to police, fire department, medical facilities, or the like may be transmitted. In those instances, the FE module(s) 110*a-b* may have been engaged with GPS navigation or traffic control communications and the override signal 132 can instruct the FE module(s) 110*a-b* to interrupt those communications in favor of the emergency signal. As described, the override signal 132 can instruct the FE module(s) 110*a-b* to select and use a specific set of antennas 160*a-b* and, additionally, specific frequency bands associated with the specific set of antennas 160*a-b* for the emergency signal transmission. As described, the RFFE controller(s) 140 can determine states/conditions/performances of antennas 160*a-b* and send a signal 142 informing the states/conditions/performances to the master controller 130. Based on the information 142, the master controller 130 can make intelligent antenna selection.

Accordingly, the radio-frequency device 100 proposes an implementation that integrates an antenna switch circuitry in its FE modules 110*a-b* along with power amplifiers 112. The implementation positions, in receive signal paths, the antenna switch circuitry 114 behind multiplexers (antennaplexers) 120*a-b* and their filter protections. As will be further described with relation to FIG. 2 and FIG. 3 that depict conventional configurations, the implementation may provide multiple benefits including lower insertion loss and significantly better radio performance while continuing to provide conventional features of sounding reference signal (SRS) antenna switching and/or antenna swap.

Figure 2:
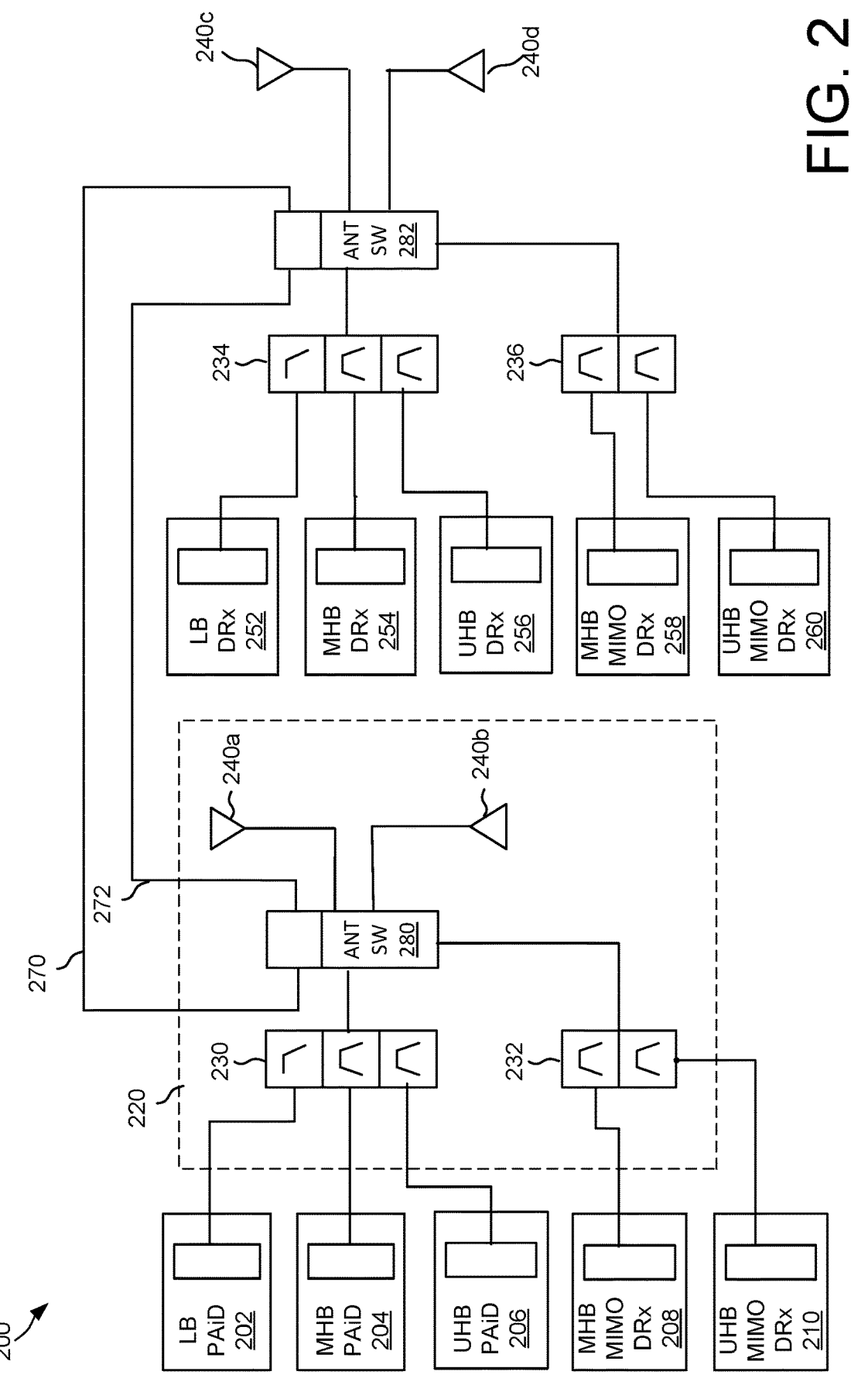
FIG. 2 illustrates a conventional antenna connectivity solution for a cellular solution that may deliver features of SRS antenna switching and/or antenna swap in accordance with one or more embodiments.

FIG. 2 illustrates a conventional antenna connectivity solution 200 for a cellular solution that may deliver features of SRS antenna switching and/or antenna swap in accordance with one or more embodiments. Specifically, the conventional solution 200 illustrates a 4-antenna interface for an RFFE with antennas 240*a-d*. The conventional solution 200 may transmit and receive radio signals with various FE modules including power-amplifier integrated duplexers (PAiD) and diversity receivers (DRx). As illustrated, some example PAiD FE modules may be LB PAiD 202, MHB PAiD 204, UHB PAiD 206. Some example DRx FE modules may be MHB MIMO DRx 208, UHB MIMO DRx 210, LB DRx 252, MHB DRx 254, UHB DRx 256, MHB MIMO DRx 258, UHB MIMO DRx 260.

The FE modules are communicatively coupled with multiplexers (antennaplexers) 230, 232, 234, 236, which are in turn communicatively coupled with antenna switches 280, 282. The antenna switches 280, 282 selects one or more antennas 240*a-d* for the FE modules to transmit or receive radio communication.

The conventional solution 200 enables various configurations that communicatively couple the FE modules to the antennas 240*a-d*. For example, the LB PAiD 202 may generate transmission signals that are filtered at the multiplexer 230. The antenna switch 280 may select the antenna 240*b* and transmit the signals using the antenna 240*b*. As another example, the antennas 240*a*, 240*b*, 240*c*, 240*d* may each receive MIMO signals and, according to antenna selections at antenna switches 280, 282, route respective received signals to multiplexers 232, 236. The signals at the multiplexers 232, 236 may in turn be sent to MHB MIMO DRx 208, 258 and/or UHB MIMO DRx 210, 260. Further, signal paths 270, 272 connecting the two antenna switches 280, 282 can route signals between the antenna switches 280, 282 and allow any of the FE modules 202, 204, 206, 208, 210, 252, 254, 256, 258, 260 to have access to any of the antennas 240*a-d*.

There are multiple drawbacks to the conventional solution 200. As block 220 illustrates, the conventional solution employs antenna switch 280 between the antennas 240*a-d* and the multiplexers 230, 232. Thus, the conventional solution 200 exposes the antenna switch 280 to higher power levels of the transmitter carriers active in the front-end. When multiple uplink transmit carriers are active about the generally nonlinear front-end, linearity/emissions/RxDeSense challenges can further complicate antenna switching for antennas that are required to be engaged and active on capable bands and band combinations. The challenges can be further complicated when all (or substantially all) available antennas are required to be engaged and active.

Figure 3:
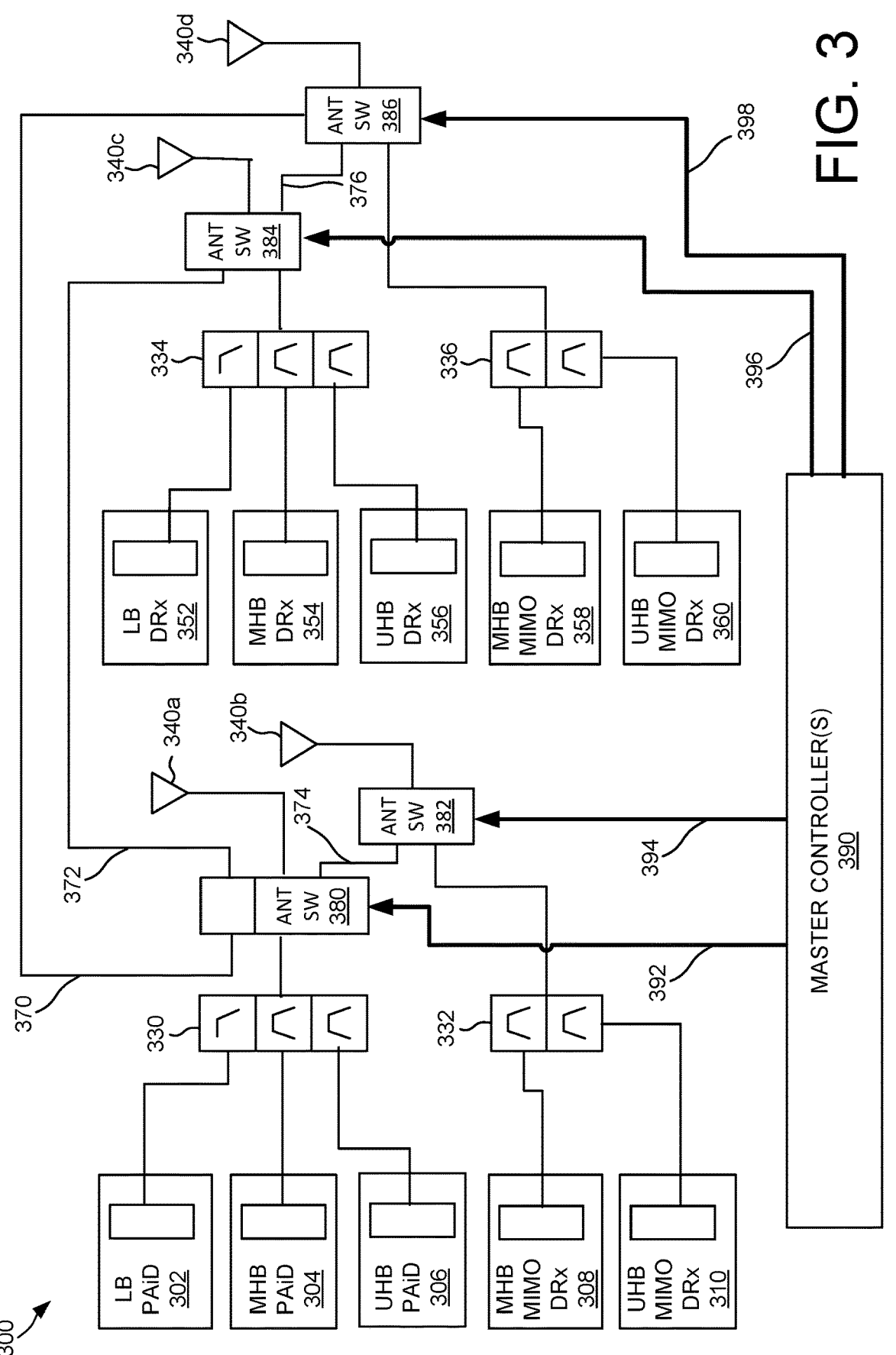
FIG. 3 illustrates a conventional eCALL solution for an automotive telematics cellular solution that may be used for a vehicle in accordance with one or more embodiments.

FIG. 3 illustrates a conventional eCALL solution 300 for an automotive telematics cellular solution that may be used for a vehicle in accordance with one or more embodiments. This conventional eCALL solution 300 focuses on transmission of an emergency signal (emergency transmission). The master controller sends an override bit to override normal radio communication antenna connectivity to use a designated set of antennas for the emergency transmission.

In some embodiments, the master controller 390 may send the override bit as a general-purpose output (GPO) and an antenna switch 380 may receive the override bit as a general-purpose input (GPI).

The conventional eCALL solution 300 illustrates a 4-antenna interface for an RFFE with antennas 340a-d. Like the conventional antenna connectivity solution 200, the conventional eCALL solution 300 transmits and receives radio signals with various FE modules including power-amplifier integrated duplexers (PAiD) and diversity receivers (DRx). As illustrated, some example FE modules can be LB PAiD 302, MHB PAiD 304, UHB PAiD 306, MHB MIMO DRx 308, UHB MIMO DRx 310, LB DRx 352, MHB DRx 354, UHB DRx 356, MHB MIMO DRx 358, UHB MIMO DRx 360. The FE modules are communicatively coupled with multiplexers (antennaplexers) 330, 332, 334, 336 which are in turn communicatively coupled with antenna switches 380, 382, 384, 386. In contrast with the conventional antenna connectivity solution 200, the conventional eCALL solution 300 provides two additional antenna switches 382, 386 that provide additional selection (switching) feature for the MIMO DRx FE modules 308, 310, 358, 360.

The conventional eCALL solution 300 enables various configurations that communicatively couple the FE modules to the antennas 340a-d. For example, the LB PAiD 302 can generate signals for transmission that are filtered at the multiplexer 330. The antenna switch 380 can select the antenna 340b for transmission of the signals and forward the signals to the antenna switch 382 which transmits the signals using the antenna 340b. As another example, the antennas 340a, 340b, 340c, 340d can each receive MIMO signals and, for the antennas 340a, 340c, route respective received signals to respective additional antenna switches 382, 386 according to antenna selections at antenna switches 380, 384 via signal paths 374, 376. The signals are then routed to multiplexers 332, 336 and sent to some or all of MIMO DRx 308, 310, 358, 360. Accordingly, via signal paths 370, 372, 374, 376, the FE modules can have access to any of the antennas 340a-d.

During an emergency, the master controller 390 can instruct the antenna switches 380, 382, 384, 386 with predetermined selection of an antenna(s). For example, the master controller 390 can send some or all of override bits 392, 394, 396, 398 to the antenna switches 380, 382, 384, 386. The override bits 392, 394, 396, 398 can be provided via one or more pinouts of the master controller 390. The antenna switches 380, 382, 384, 386 are configured to select one or more predetermined antennas for the emergency transmission. In some embodiments, the predetermined antenna can be a designated (default) antenna of an antenna switch. For instance, upon receiving an override bit 392 from the master controller 390, the antenna switch 380 may select its designated antenna 340a for the emergency transmission.

There are multiple drawbacks to the conventional eCALL solution 300. In the conventional eCALL solution 300, the master controller 390 does not receive input regarding states/conditions/performances of the antennas 340a-340d and/or the antenna switches 380, 382, 384, 386. Thus, the conventional eCALL solution 300 can be of limited use when an antenna designated for emergency transmission is damaged during an accident. Even if the designated antenna is operational, the designated antenna may not be the best performing antenna (e.g., an antenna with the best signal-to-noise ratio compared to other antennas) after the accident. Thus, the conventional eCALL solution 300 may not transmit the emergency signal satisfactorily. Further, like the block 220 of the conventional antenna switching solution 200, the conventional eCALL solution 300 exposes the antenna switches 380, 382, 384, 386 to higher power levels of the transmitter carriers active in the front-end and, when multiple uplink transmit carriers are active about the generally nonlinear front-end, linearity/em issions/RxDeSense challenges can further complicate emergency transmission.

As illustrated, the conventional approaches of FIG. 2 and FIG. 3 employ antenna switching that is post multiplexer (post antennaplexer). In FIG. 2, the antennas 240a-b are positioned after the antenna switch 280 in relation to the multiplexers 230, 232. Similarly, the antennas 240c-d are positioned after the antenna switch 282 in relation to the multiplexers 234, 236. In FIG. 3, the antennas 340a-b are positioned after the antenna switches 380, 382 in relation to the multiplexers 330, 332. Similarly, in FIG. 3, the antennas 340c-d are positioned after the antenna switches 384, 386 in relation to the multiplexers 334, 336. These conventional configurations expose the antenna switches 380, 382, 384, 386 to higher power levels of the transmitter carriers active in the front-end, as well as blockers from outside the vehicle.

Figure 4:
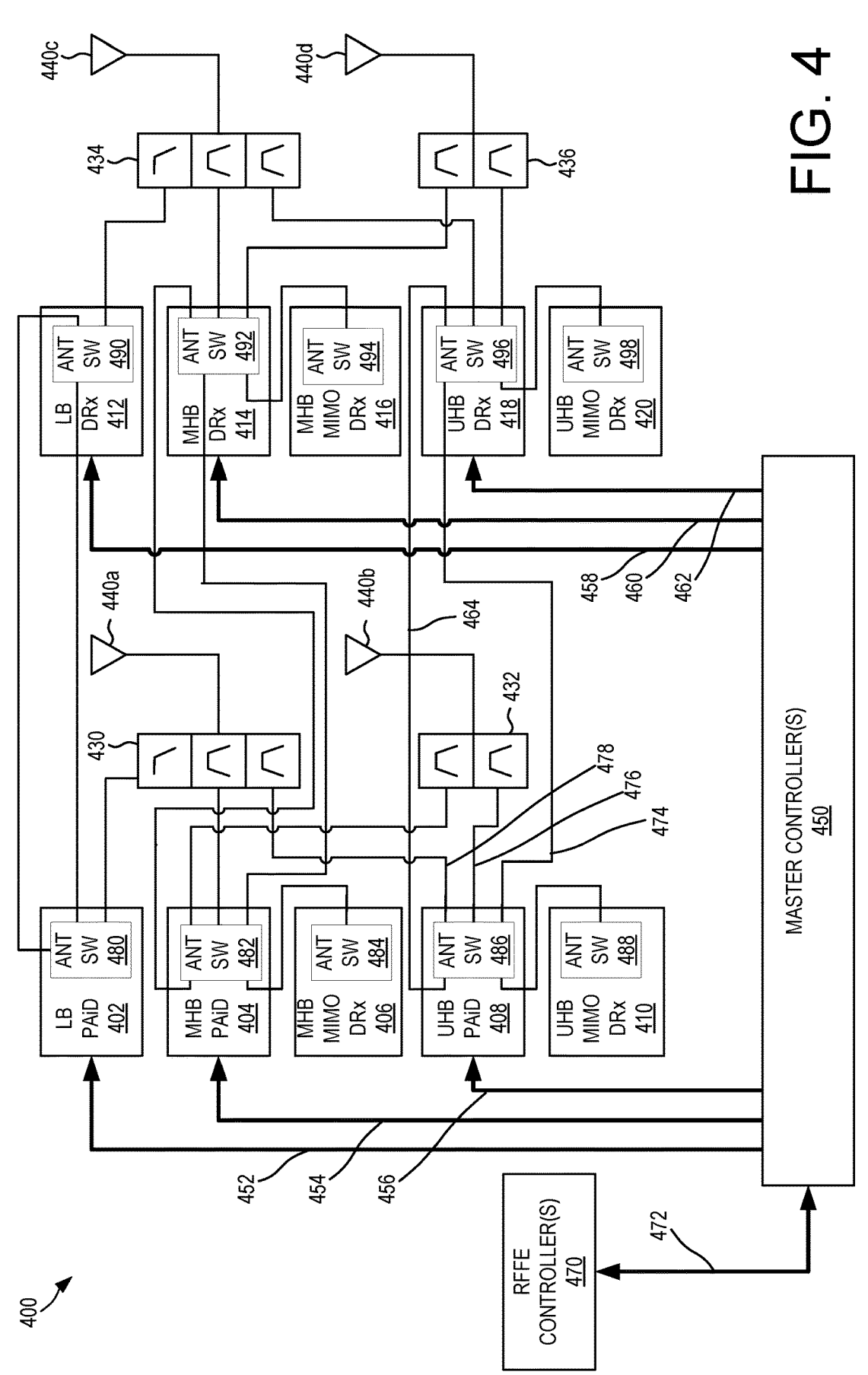
FIG. 4 illustrates an improved approach that employs FE modules integrating a power amplifier and an antenna switch circuitry in accordance with one or more embodiments.

FIG. 4 illustrates an improved approach 400 that employs FE modules integrating a power amplifier and an antenna switch circuitry (e.g., ASM) in accordance with one or more embodiments. This is in line with FIG. 1 example FE modules 110a-b that include both a power amplifier 112 and an antenna switch circuitry 114. The improved approach 400 can provide numerous advantages, including:

1. Lower insertion loss vs. the cascading of an additional series switch;
2. Improved intermodulation, harmonic generation, and Rx Self-DeSense when antenna switch function is protected by an out-of-band (OOB) attenuation filtering of an antennaplexer (especially for harmonically related downlink carrier aggregation (DL-CA) and challenging Evolved-Universal Terrestrial Radio Access-New Radio (EN-DC) cases); and
3. Smaller and lower cost implementation.

The improved approach 400 can provide numerous other advantages.

In the improved approach 400, an RFFE can send a small number of override signals to one or more FE modules to override normal radio communication. For instance, the RFFE can send GPO bits to a mobile industry processor interface (MIPI) based controller within an ASM to coordinate antenna switching for eCALL connectivity and communication during a vehicle collision event.

The improved approach 400, in addition to dynamic loading on antennas with antenna switching, focuses on ensuring functionality of eCALL in which an emergency call must be made after an accident. In such emergency, it is possible one or more of the antennas of the vehicle is destroyed and unavailable to establish a communication link. Hopefully, a master controller somewhere away from the crumple zone is preserved and, uncoordinated with the timing and network connection of the radio solution, finds the best/optimal functioning set of antennas. The best/optimal functioning set of antennas can be determined based on antenna condition/performance/states which can be determined based on various feedback the master controller receives regarding the set of antennas. Then, the master controller can send an override signal (e.g., GPO signals) the FE modules in order to override the normal radio communication antenna connectivity and use the functioning best/optimal functioning set of antennas. Accordingly, the vehicle may find the best working set of antennas and emergency transmission.

The improved approach 400 illustrates a 4-antenna interface for a RFFE with antennas 440a-d. Although various examples are described in the context of four antennas, it will be understood that one or more features of the present disclosure can also be implemented for wireless devices having other numbers of antennas. It will also be understood that not all of such four antennas necessarily need to be utilized when one or more features of the present disclosure is/are implemented in the wireless devices.

The RFFE can transmit and receive radio signals with various FE modules that include, as example components, power-amplifier integrated duplexers (PAiD) and diversity receivers (DRx). As illustrated, some example FE modules can be LB PAiD 402, MHB PAiD 404, UHB PAiD 408, MHB MIMO DRx 406, UHB MIMO DRx 410, LB DRx 412, MHB DRx 414, UHB DRx 418, MHB MIMO DRx 416, UHB MIMO DRx 420. Some or all of the FE modules 402, 404, 406, 408, 410, 412, 414, 416, 418, 420 can include a respective antenna switch 480, 482, 484, 486, 488, 490, 492, 494, 496, 498. The antenna switches 480, 482, 484, 486, 488, 490, 492, 494, 496, 498 can be communicatively coupled with multiplexers (antennaplexers) 430, 432, 434, 436 which are in turn communicatively coupled with antennas 440a-d. For example, the UHB PAiD 408 can include an antenna switch 486, which is communicatively coupled with a first antennaplexer 430 via a first signal path 478 and a second antennaplexer 432 via a second signal path 476. The first antennaplexer 430 is, in turn, communicatively coupled with a first antenna 440a and the second antennaplexer 432 is, in turn, communicatively coupled with a second antenna 440b.

In some embodiments, an antenna switch of an FE module can be additionally connected with another antenna switch of a different FE module to provide access to one or more antennas connected to the different FE module. For example, the antenna switch 486 of UHB PAiD 408 can be communicatively coupled with the antenna switch 496 of UHB DRx 418 via a signal path 474. The connection from an antenna switch 486 to another antenna switch 496 (e.g., connection from an FE module to another FE module) can allow access and use of antennas 440d connected to the antenna switch 496. Similarly, the antenna switch 496 communicatively coupled to the antenna switch 486 via a signal path 464 can access and use the antennaplexer 432 and its antenna 440b. Accordingly, the improved approach 400 can enable various configurations that communicatively couple its FE modules 402, 404, 406, 408, 410, 412, 414, 416, 418, 420 to the antennas 430a-d.

In the improved approach 400, antenna switches are not exposed to higher power levels of the transmitter carriers active in the front-end. For example, the improved approach 400 positions the antennaplexers 430, 432, 434, 436 between the antenna switches 480, 482, 484, 486, 488, 490, 492, 494, 496, 498 and the antennas 440a-d. In contrast to the conventional solutions 200, 300 that exposed their antenna switches to antennas, the improved approach 400 does not expose the antenna switches 480, 482, 484, 486, 488, 490, 492, 494, 496, 498 to the antennas 440a-d. Accordingly, the antenna switches 480, 482, 484, 486, 488, 490, 492, 494, 496, 498 are less affected by transmit carriers that are active near the antennas 440a-d. Accordingly, the improved approach 400 need not be as concerned about linearity/emissions/RxDeSense challenges present in the conventional solutions 200, 300 with regard to antenna switching.

As an example signal path, the UHB PAiD 408 can generate signals for transmission. The antenna switch 486 can select an antenna or another antenna switch for the signal. In the example, the antenna switch 486 can select the antennaplexer 432 and forward the signal via the signal path 476. The signal can be filtered at the antennaplexer 432 and forwarded to the antenna 440b which, in turn, can transmit the signal to outside entities. As other example signal paths, the antennas 440b, 440d can each receive UHB MIMO signals and route the received UHB MIMO signals to respective antennaplexers 432, 436 which, in turn, filter and/or forward the received UHB MIMO signals to respective antenna switches 486, 496. The antenna switches 486, 496 can further forward the signals to respective antenna switches 488, 498 each respectively associated with the UHB MIMO DRx 410, 420 FE modules. Accordingly, the improved approach 400 allows various configurations and antenna use scenarios.

During an emergency, the master controller 450 can detect the emergency with various connected sensors including inertia measurement unit (IMU), accelerometers, collision sensor, or the like. Then, the master controller 490 can assist antenna selection for some or all of the FE modules 402, 404, 406, 408, 410, 412, 414, 416, 418, 420 by providing override signals (e.g., signals 452, 454, 456, 458, 460, 462) to the FE modules. The FE modules receiving the override signals can inform its antenna switch to select an antenna (or, as described, another antenna switch associated with the antenna) based on information contained within the override signals. For example, the override signal 456 can instruct the UHB PAiD 408 to configure its antenna switch 486 such that future emergency transmission is forwarded to the antennaplexer 432 via the signal path 476 and, ultimately, transmitted using the antenna 440b.

In some embodiments, the override signals can inform a receiving FE module whether or not to transceive at all, thereby giving other FE modules prioritized access to the antennas 440a-d. As an example, the override signals 452, 458 can inform the LB PAiD 402 and LB DRx 412 associated with low-range frequency band to stop transmission activities such that UHB PAiD 408 and UHB DRx 418 associated with ultra-high-range frequency band can focus on transmission and reception of emergency signals. Accordingly, the override signals 452, 454, 456, 458, 460, 462 can instruct FE modules 402, 404, 406, 408, 410, 412, 414, 416, 418, 420 to connect or disconnect signal paths that were, before the emergency, used for normal radio transmission. As an example, the master controller 450 can instruct disconnection of (or otherwise stop signals to and from) DRx modules 406, 410, 412, 414, 416, 418, 420 while instructing prioritized connection for some or all of PAiD modules 402, 404, 408. The disconnection can effectively block signals transmitted/forwarded by or received from the affected modules. Accordingly, the override signals 452, 454, 456, 458, 460, 462 from the master controller 450 may prioritize emergency transmission to select frequency band, select protocol (e.g., MIMO or otherwise), certain antennas, and/or any combinations thereof.

As described in relation to FIG. 1, the master controller 450 can intelligently select one or more antennas for the emergency transmission. The RFFE controller(s) 470 can determine states/conditions/performances of antennas 440a-d and send a feedback 472 informing the states/conditions/performances to the master controller 450. Based on the feedback 472, the master controller 450 can determine one or more antennas to use for emergency transmission and generate override signals instructing antenna switches to select the antennas. For example, the master controller 450 can prioritize functioning antennas over damaged/defunct antennas. As another example, the master controller 450 can prioritize antennas with higher SNR over antennas with lower SNR. As yet another example, the master controller can prioritize a single antenna communication (e.g., not MIMO) over multiple antenna communication (e.g., MIMO), or vice versa, to further ensure critical emergency transmission. Many variations are possible.

In some embodiments, the master controller 450 may, over time, select multiple sets of antennas and repeat the emergency transmission with each set of antennas. For example, upon determining functional antennas (e.g., based on the feedback 472), the master controller 450 may determine different sets of functioning antennas combinations and use each set in a round-robin manner in emergency transmissions. The repeated transmission over different frequency bands and protocols may help ensure receipt of the emergency transmission by an external entity. Accordingly, the improved approach 400 can facilitate successful emergency transmission.

Figure 5:
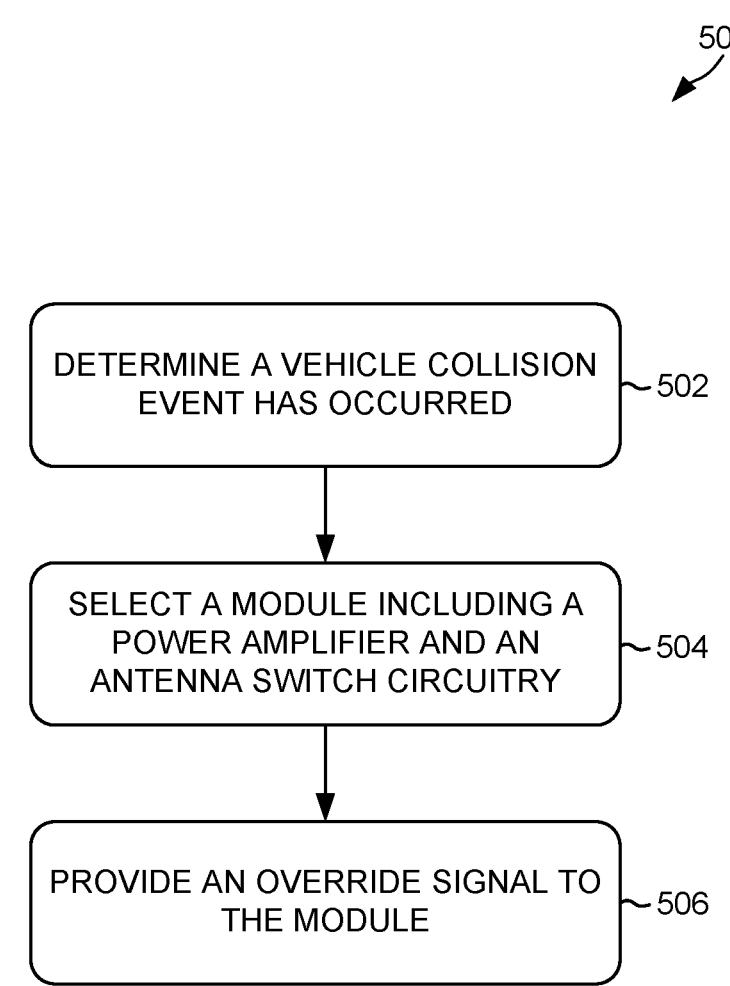
FIG. 5 illustrates an example flow diagram of a process to provide an override signal to an antenna switch circuitry within an FE module in accordance with one or more embodiments.

FIG. 5 illustrates an example flow diagram of a process 500 to provide an override signal to an antenna switch circuitry within an FE module in accordance with one or more embodiments. The process can be implemented for a master controller, such as the master controller 130 of FIG. 1 and/or the master controller 450 of FIG. 4.

At 502, the master controller can determine whether a collision event has occurred. In some embodiments, the master controller can determine an occurrence of the collision event. For example, the master controller may have access to an inertia measurement unit (IMU) or an accelerometer that provides measurement profile indicative of a collision. In some other embodiments, the master controller may receive a determination of the collision event from an external component, such as an electronic control unit (ECU) of a vehicle.

At 504, the master controller can select a module including a power amplifier and an antenna switch circuitry. For example, the master controller 130 of FIG. 1 can select the FE module 110*a* that includes the power amplifier 112 and the antenna switch circuitry 114. In some embodiments, the master controller can select the module based on conditions/ states/performances associated with one or more antennas managed by the antenna switch circuitry. During selection, the master controller can prioritize some antennas over other antennas based on various criteria. The master controller may select (1) a functioning antenna over a defunct antenna, (2) an antenna with a higher SNR over another antenna with a lower SNR, (3) an antenna higher in priority in a priority list over a lower priority antenna, (4) an antenna operating with a higher priority frequency band or a frequency band that has longer reach, (5) an antenna operating with a less frequently used frequency band in order to ensure emergency transmission, or some other criteria.

At 506, the master controller can provide an override signal to the selected module. The override signal can cause antenna selection at the selected module to override antenna selection instructed by a RFFE controller (e.g., the RFFE controller 140 of FIG. 1 or the RFFE controller 470 of FIG. 4). In some embodiments, the override signal can be a single bit (e.g., a single GPO bit) that instructs the selected module to select a default antenna. In some other embodiments, the override signal can be multiple bits (e.g., multiple GPO bits) on a bus that can instruct the selected module to select an antenna specified within the multiple bits. In some embodiments, the multiple bits can include a code indicative of an antenna and/or an antenna switch to select. Depending on how comprehensive antenna selection should be at the selected module, the override signal can be smaller or larger in size.

The override signal can be provided uncoordinated (asynchronously) with the timing of normal radio communication. In other words, the override signal can interrupt the normal radio communication and allow immediate antenna selection for and provision of emergency transmission.

In some embodiments, the master controller can select multiple antennas for the emergency transmission. For example, the override signal can indicate selection of multiple antennas. As another example, the master controller can select a first antenna for initial emergency transmission. After the initial transmission completes for a particular frequency band associated with the first antenna, the master controller may repeat 504 and 506 to select a second antenna associated with a second frequency band to additionally transmit the emergency transmission. Many variations are possible.

Figure 6:
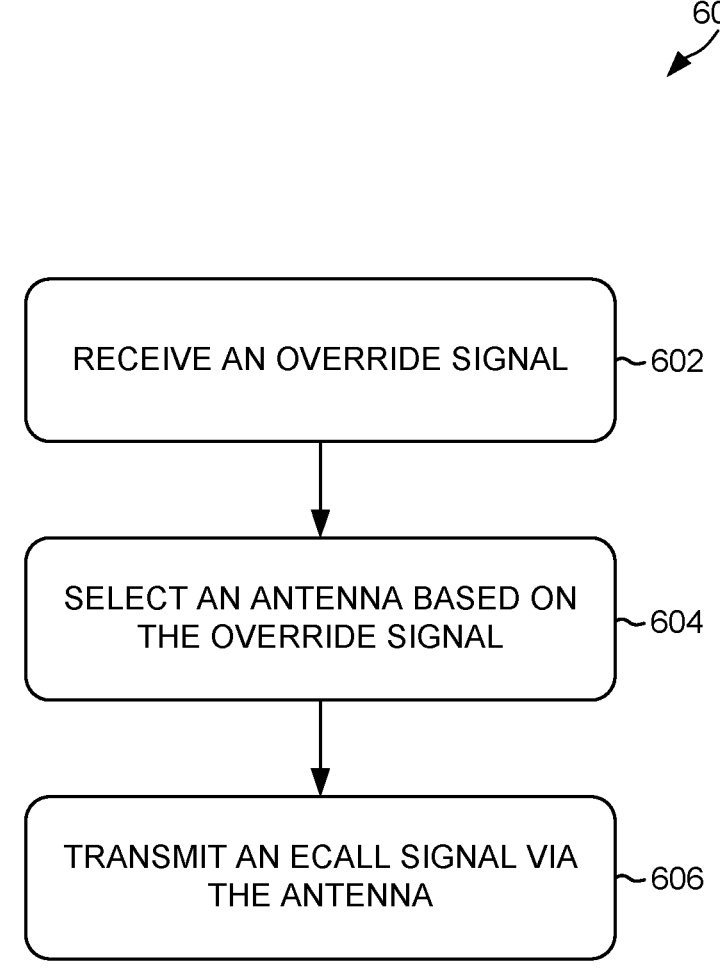
FIG. 6 illustrates an example flow diagram of a process to transmit an emergency transmission in accordance with one or more embodiments.

FIG. 6 illustrates an example flow diagram of a process 600 to transmit an emergency transmission in accordance with one or more embodiments. The process can be implemented for an FE module, such as the FE module 110*a-b* of FIG. 1 and/or the PAiD modules 402, 404, 408, 412, 414, 418 of FIG. 4.

At 602, the FE module can receive an override signal. The override signal can be a signal from a master controller (e.g., the master controller 450 of FIG. 4). In some embodiments, the override signal can be a single bit that instructs the FE module to select a designated (predetermined) antenna. In some other embodiments, the override signal can be multiple bits on a bus that instructs the FE module to select an antenna specified in those bits. The FE module can receive the single bit or the multiple bits as general-purpose input (GPI). The FE module, upon receiving the override signal, can override its antenna swap control for eCALL applications.

At 604, the FE module can select an antenna based on the override signal. As described, the override signal can specify an antenna to use for an emergency transmission. The FE module can determine the antenna based on the override signal and select it for the emergency transmission.

At 606, the FE module can transmit the emergency transmission using the antenna selected at 604. As described, the emergency transmission can reach the selected antenna via a signal path that includes an antennaplexer between the FE module and the selected antenna. The emergency transmission from the FE module may be filtered before reaching the selected antenna.

Figure 7:
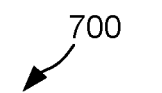
FIG. 7 illustrates an example radio-frequency module in accordance with one or more embodiments.
Figure 7:
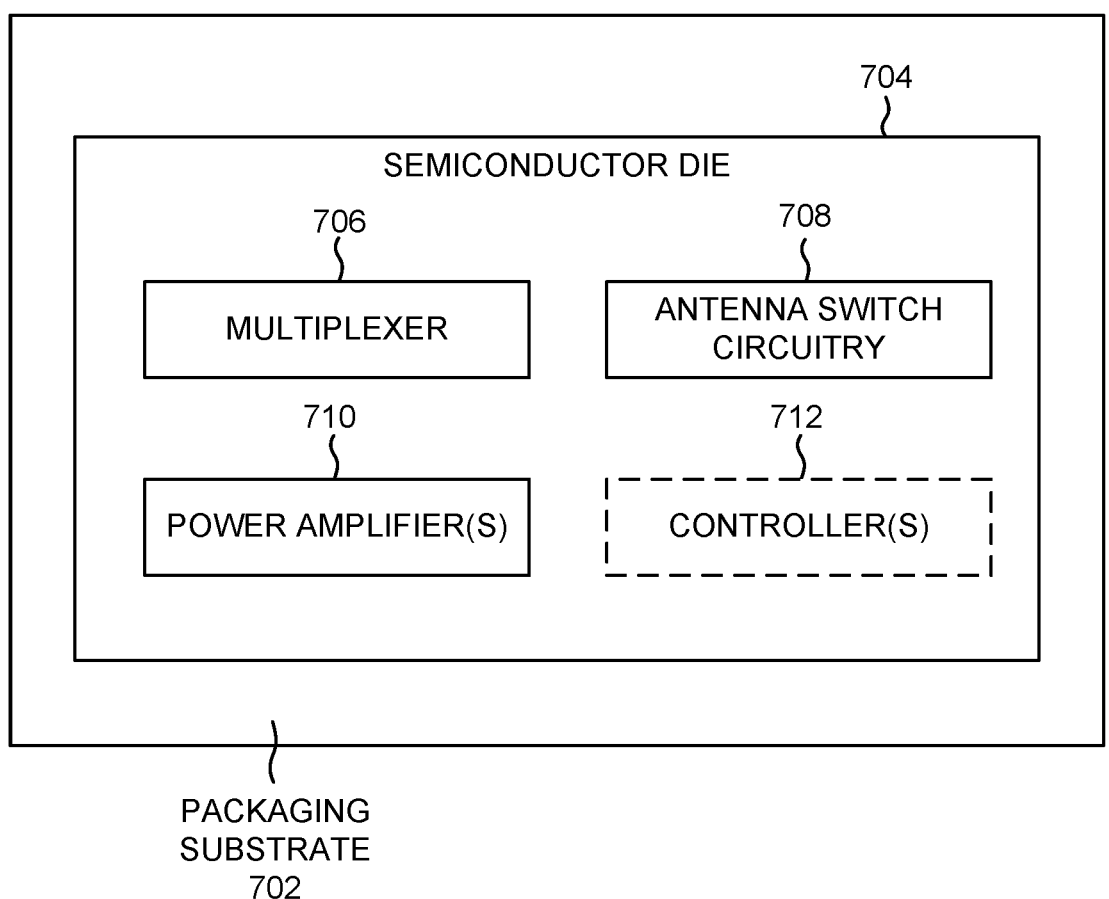

FIG. 7 illustrates an example radio-frequency module 700 in accordance with one or more embodiments. The radio-frequency module 700 includes a packaging substrate 702, a semiconductor die 704 mounted on the packaging substrate 702, a multiplexer (an antennaplexer) 706 implemented on the semiconductor die 704, an antenna switching circuitry 708 implemented on the semiconductor die 704, and, optionally, a controller(s) 710 implemented on the semiconductor die 704. The multiplexer 706 can include any of the multiplexers discussed herein, the antenna switching circuitry 708 can include any of the antenna switching circuitries discussed herein, and/or the controller(s) 712 can include any of the controllers discussed herein, including any combination of a MIPI controller, a master controller, and a RFFE controller. Although the controller 712 is illustrated as being implemented on the semiconductor die 704 and the packaging substrate 702, the controller 712 can be implemented on a separate semiconductor die and/or packaging substrate. Similarly, the multiplexer 706 and the antenna switching circuitry 708 can be implemented on separate semiconductor dies and/or packaging substrates. In some embodiments, the radio-frequency module 700 can be a front-end module (FEM).

Figure 8:
FIG. 8 illustrates an example radio-frequency device in accordance with one or more embodiments.

FIG. 8 illustrates an example radio-frequency device 800 in accordance with one or more embodiments. As shown, the radio-frequency device 800 can include a baseband sub-system 802, a transceiver 804, one or more controllers (e.g., a master controller and/or a RFFE controller) 806, one or more front-end (FE) modules 808, one or more antennas 810a-b, one or more low noise amplifiers (LNAs) 812, a power management system 814, a battery 816, a memory 818, a user interface 820, one or more filters 822, and one or more antennaplexers (multiplexers) 830. The baseband sub-system 802, the transceiver 804, the one or more controllers 806, the one or more FE modules 808, the one or more antennas 810, the one or more LNAs 812, the power management system 814, the battery 816, the memory 818, the user interface 820, the one or more filters 822, and/or the one or more antennaplexers 830 can be in communication with each other.

The baseband sub-system 802 can be connected to the user interface 820 to facilitate various input and/or output of voice and/or data provided to and/or received from a user. The baseband sub-system 802 can also be connected to the memory 818 that is configured to store data and/or instructions to facilitate operation of the radio-frequency device 800 and/or to provide storage of information for a user.

The transceiver 804 can generate radio-frequency (RF) signals for transmission and/or process incoming RF signals received from the one or more LNAs 812, the one or more antennas 810a-b, the one or more filters 822, and/or the one or more FE modules 808. The transceiver 804 can interact with the baseband sub-system 802 that is configured to provide conversion between data and/or voice signals suitable for a user and/or RF signals suitable for the transceiver 804. The transceiver 804 can also be connected to the power management system 814.

The one or more controllers 806 can include an RF FE controller and/or a master controller. The RF FE controller can coordinate normal radio communication, determine condition/states/performances of various components including the one or more antennas 810a-b. The master controller that coordinates override signals (e.g., the eCALL override signals), communication timings, and emergency signal transmissions. The one or more controllers 806 can be in communication with each other to facilitate antenna switching during normal radio communication and eCALL communication.

The one or more FE modules 808 can include at least one power amplifier 822, an antenna switch 824, optionally a duplexer 826, and/or a switch assembly 828. The at least one power amplifier can provide an amplified RF signal to the one or more antennas 810a-b, such as via one or more components of the one or more FE modules 808. The antenna switch 824 can route a signal to and/or from the one or more antennas 810a-b, such as to and/or from other components of the one or more FE modules 808, using the switch assembly 828. The switch assembly 828 can include any number of poles and/or throws. In some embodiments, the antenna switch 824 and the switch assembly 828 are implemented as part of a module. The duplexer 826 can allow transmit and/or receive operations to be performed simultaneously using a common antenna. In some embodiments, the one or more FE modules 808 can route one or more received signals to the one or more LNAs 812, which can be configured to amplify the one or more received signals. Although the one or more LNAs 812 and the FE module 808 are illustrated as separate components from the radio-frequency device 800, in some embodiments the one or more LNAs 812 and/or the FE module 808 are part of the FE module 808. Although one FE module 808 is shown, any number of FE modules can be implemented.

The one or more antennas 810a-b can include antennas for transmitting and/or receiving signals associated with a wide variety of frequencies and communications standards. In examples, the one or more antennas 810a-b support Multiple-Input Multiple-output (MIMO) communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity can refer to communications in which a particular antenna is selected for operation at a particular time. The antenna switch 824 can select an antenna and can use the switch assembly 828 to cause signals to follow a signal path to and from the antenna. For example, a switch can be used to select a particular antenna from a group of antennas based on a variety of factors, such as an observed bit error rate and/or a signal strength indicator. In examples, the one or more antennas 810a-b can include a diversity antenna. In some embodiments, receive operations can also be achieved through some or all of the one or more antennas 810a-b.

The one or more antennas 810a-b can include a diversity antenna and the FE module 808 can be a diversity receive (DRx) module implemented between the diversity antenna and the FE module 808. Such a configuration can allow an RF signal received through the diversity antenna to be processed (in some embodiments, including amplification by the LNA 812) with little or no loss of and/or little or no addition of noise to the RF signal from the diversity antenna.

The one or more filters 822 can include receive (Rx) filters and/or transmit (Tx) filters. In some embodiments, one or more of the one or more filters 822 are implemented as part of an antennaplexer (e.g., as part of the antennaplexer 830). The one or more antennaplexers 830 can be configured to implement multiplexing for signals that are received by or sent to the one or more antennas 810a-b.

The power management system 814 can be configured to manage power for operation of the radio-frequency device 800. The power management system 814 can provide power to any number of components of the radio-frequency device 800. The power management system 814 can receive a battery voltage from the battery 816. The battery 816 can be any suitable battery for use in the radio-frequency device 800, including, for example, a lithium-ion battery.

The radio-frequency device 800 can communicate using a wide variety of communications technologies, including, but not limited to, 2G, 3G, 4G (including Long Term Evolution (LTE), LTE-Advanced, and LTE-Advanced Pro), 5G, Wireless Local Area Network (WLAN) (for instance, Wi-Fi), Wireless Personal Area Network (WPAN) (for instance, Bluetooth and ZigBee), Wireless Metropolitan Area Network (WMAN) (for instance, WiMax), and/or satellite-based radio navigation systems (for instance, Global Positioning System (GPS) technologies).

The radio-frequency device 800 can operate with beam-forming in certain implementations. For example, the radio-frequency device 800 can include phase shifters having variable phase controlled by the transceiver 804. Additionally, the phase shifters can be controlled to provide beam formation and directivity for transmission and/or reception of signals using the one or more antennas 810*a-b*. For example, in the context of signal transmission, the phases of the transmit signals provided to the one or more antennas 810*a-b* are controlled such that radiated signals from the one or more antennas 810*a-b* combine using constructive and destructive interference to generate an aggregate transmit signal exhibiting beam-like qualities with more signal strength propagating in a given direction. In the context of signal reception, the phases are controlled such that more signal energy is received when the signal is arriving to the one or more antennas 810*a-b* from a particular direction. In some embodiments, the one or more antennas 810*a-b* include one or more arrays of antenna elements to enhance beamforming.

In some embodiments, the radio-frequency device 800 supports carrier aggregation, thereby providing flexibility to increase peak data rates. Carrier aggregation can be used for both Frequency Division Duplexing (FDD) and Time Division Duplexing (TDD) and can be used to aggregate a plurality of carriers or channels. Carrier aggregation includes contiguous aggregation, in which contiguous carriers within the same operating frequency band are aggregated. Carrier aggregation can also be non-contiguous and can include carriers separated in frequency within a common band or in different bands.

The radio-frequency device 800 can include a wide variety of devices that are configured to communicate wirelessly. For example, the radio-frequency device 800 can include a cellular phone, a smart-phone, a hand-held wireless device with or without phone functionality, a wireless tablet, a smart appliance, a smart vehicle, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi-functional peripheral device, a wearable device (e.g., a watch), a clock, etc.

The detailed description is set forth with reference to the accompanying figures. In the figures, the left-most digit(s) of a reference number identifies the figure in which the reference number first appears. The use of the same reference numbers in different figures indicates similar or identical items.

The detailed description is set forth with reference to the accompanying figures. In the figures, the left-most digit(s) of a reference number identifies the figure in which the reference number first appears. The use of the same reference numbers in different figures indicates similar or identical items.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

The above description of embodiments of the disclosure is not intended to be exhaustive or to limit the disclosure to the precise form disclosed above. While specific embodiments, and examples, are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The features described herein can be applied to other systems, not necessarily the system described above. The elements and acts of the various embodiments described above can be combined to provide further embodiments.

While some embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. Claims and their equivalents are intended to cover such forms or modifications as would fall within the scope and spirit of the disclosure.

What is claimed is:

1. A system comprising:
a plurality of antennas including a first antenna;
a first module including a first power amplifier and a first antenna switch;
a first antennaplexer communicatively coupled to the first antenna and the first antenna switch, the first antennaplexer positioned between the first antenna switch and the first antenna in a first signal path;
a radio-frequency front-end controller communicatively coupled to the first module, the radio-frequency front-end controller configured to instruct the first module to select the first antenna to transmit a signal; and
a master controller communicatively coupled to the first module, the master controller configured to send an override signal to the first module in connection with an emergency communication, the override signal configured to override selection of the first antenna by the radio-frequency front-end controller to transmit a signal.

2. The system of claim 1 wherein the master controller is configured to send the override signal to the first module in response to an occurrence of a vehicle collision.

3. The system of claim 2 wherein the occurrence of the vehicle collision is determined by the master controller.

4. The system of claim 2 wherein the radio-frequency front-end controller makes a determination of the occurrence of the vehicle collision and the radio-frequency front-end controller sends the determination to the master controller.

5. The system of claim 4 wherein the determination is made based on at least one of an inertial measurement unit, an accelerometer, or a collision sensor.

6. The system of claim 1 wherein the override signal includes a code indicative of an antenna to select.

7. The system of claim 1 wherein the override signal causes the first antenna switch to select the first antenna based on at least one of a state, a condition, or a performance of the first antenna.

8. The system of claim 7 wherein the state, the condition, or the performance of the first antenna is received from the radio-frequency front-end controller.

9. The system of claim 1 further comprising a second antenna and a second antennaplexer communicatively coupled to the second antenna and the first antenna switch, the second antennaplexer positioned between the first antenna switch and the second antenna in a second signal path.

10. The system of claim 9 wherein the override signal causes the first antenna switch to select the second antenna and route a transmission signal to the second antennaplexer.

11. The system of claim 1 further comprising a second module including a second power amplifier and a second antenna switch, the second antenna switch communicatively coupled with the first antenna switch.

12. The system of claim 11 wherein the override signal causes the first antenna switch to route a transmission signal to a second antenna via the second antenna switch.

13. The system of claim 11 wherein the first module includes a power amplifier with integrated duplexer associated with a frequency band and the second module includes a diversity receiver associated with the frequency band.

14. The system of claim 11 wherein the first module includes a power amplifier with integrated duplexer associated with a frequency band and the second module includes a multiple-in-multiple-out (MIMO) diversity receiver associated with the frequency band.

15. A controller of a radio-frequency device comprising:

a first pinout configured to provide a first override signal to a first module including a first amplifier and a first antenna switch, the first override signal configured to override selection of an antenna by a radio-frequency front-end controller to transmit a signal in an emergency communication;

a second pinout configured to provide a second override signal to a second module including a second amplifier and a second antenna switch, the second override signal configured to override selection of an antenna by the radio-frequency front-end controller to transmit a signal in an emergency communication; and a memory configured to store instructions that cause the controller to determine an occurrence of a vehicle collision event and provide at least one of the first override signal or the second override signal.

16. The controller of claim 15 wherein the controller is configured to receive at least one of a state, a condition, or a performance associated with an antenna and generate the first override signal that instructs the first antenna switch to select the antenna based on the at least one of the state, the condition, or the performance.

* * * * *